Patented Feb. 9, 1937

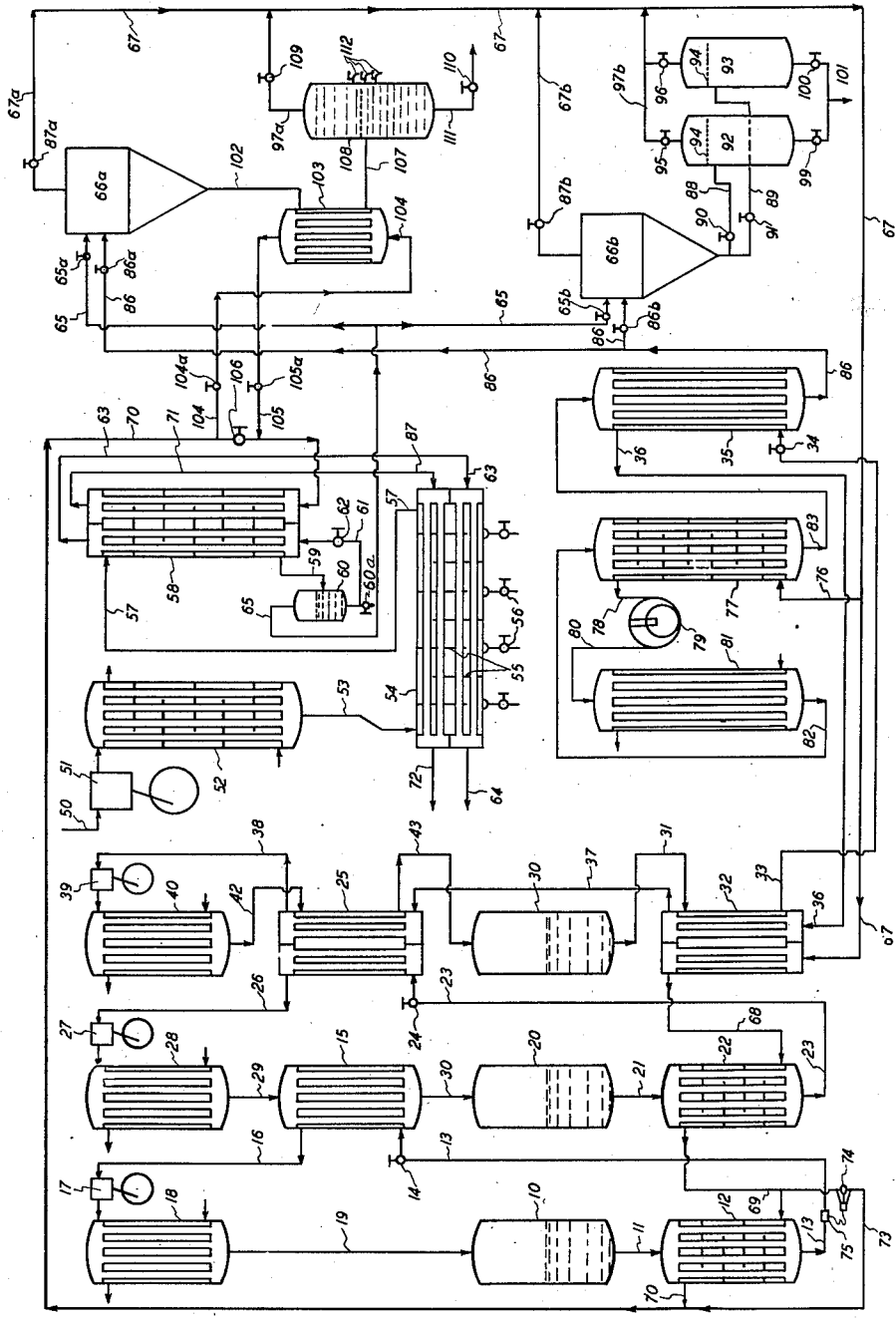

2,070,098

UNITED STATES PATENT OFFICE 2,070,098

METHOD OF REMOVING HYDROGEN SULPHIDE FROM HYDROCARBON GASES

Lee S. Twomey, Vista, Calif.

Application May 9, 1934, Serial No. 724,696

16 Claims. (Cl. 62—175.5)

The object of my invention is to provide means and a method for removing hydrogen sulphide from hydrocarbon gases such as natural gas, the gas produced by cracking stills and other natural or artificial gases in which it may occur in large quantity or constitute an objectionable impurity.

In some natural gases, in particular, hydrogen sulphide often occurs in such large quantity as to render removal by water washing or chemical solution unduly expensive. The treatment herein proposed removes all but a minor trace of this impurity, together with whatever carbon dioxide, ethane, and propane may occur in the raw material, and delivers a dry purified gas at pipe line pressure.

The attached drawing, to which reference is made in the following description, shows in highly diagrammatic form a complete apparatus suited to the performance of the method steps, and having two alternative means for performing the final step of separation.

Liquid anhydrous ammonia is stored in a receiver 10 from which it flows through pipe 11 to and through an interchanger 12 in which it is supercooled to 196° K. by cold gases returned from a later stage in the treatment. From this interchanger a stream of liquid ammonia flows through pipe 13 to an expansion valve 14 by which it is admitted to the shell of a condenser 15. This shell being maintained at a pressure of one atmosphere absolute, the ammonia evaporates in withdrawing heat from compressed gaseous ethylene passing through the tubes. The vaporized ammonia, at atmospheric temperature and pressure, passes through pipe 16 to a compressor 17 by which it is raised to a pressure of 7.5 atm. absolute. The compressed gas passes into a condenser 18 which is supplied with cold water as indicated by the arrows marked "W". At 7.5 atm. absolute and atmospheric temperature the ammonia condenses, flowing through pipe 19 into receiver 10, thus completing a closed ammonia cycle. The ammonia collects in this receiver at 7.5 atm. and 290° K.

Liquid ethylene is stored in a receiver 20 from which it flows through pipe 21 to and through an interchanger 22 in which it is supercooled to 180° K. by cold gases returned from a later stage in the treatment. From this interchanger a stream of liquid ethylene flows through pipe 23 to an expansion valve 24 by which it is admitted to one of the tube banks of a condenser 25. These tubes being maintained at a pressure of 2.5 atm., the ethylene evaporates in withdrawing heat from compressed gaseous methane flowing through the shell. The vaporized ethylene at 2.5 atm. and 285° K. passes through pipe 26 to a compressor 27 in which its pressure is raised to 18 atm. The compressed gas passes into a cooler 28 which is supplied with cold water, and thence through pipe 29 to condenser 15 where it is cooled by evaporating ammonia, as described, to a temperature of 240°, at which it condenses and flows through pipe 30 into receiver 20, thus completing a closed ethylene cycle. The ethylene collects in this receiver at 18 atm. and 240° K.

Liquid methane is stored in a receiver 30 from which it flows through pipe 31 to and through the shell of an interchanger 32 in which it is supercooled to 151° K. by cold gases returned from a later stage in the treatment. From this interchanger a stream of liquid methane flows through pipe 33 to an expansion valve 34 by which it is admitted to the shell of an interchanger 35. This shell being maintained at a pressure of 8.2 atm., the methane evaporates in withdrawing heat from a gas, later referred to, which is passing through the tubes. The vaporized methane at 8.2 atm. and 146° K. passes through pipe 36 to one of the tube banks of interchanger 32 in which it is heated to 175° K. in assisting to supercool the liquid methane, then through pipe 37 to one of the tube banks of interchanger 25 in which it is heated to 285° K. in condensing compressed methane, and thence through pipe 38 to a compressor 39 in which its pressure is raised to 37.5 atm. The compressed gas passes into a cooler 40 which is supplied with cold water, thence through pipe 42 to the shell of condenser 25 where it is cooled by evaporating ethylene and cold gaseous methane to 185° K., at which it condenses and flows through pipe 43 into receiver 30, thus completing a closed methane cycle. The methane collects in this receiver at 37.5 atm. and 185° K.

The raw gas to be treated enters the system through pipe 50 and is raised by compressor 51 to a pressure of 10 atm. absolute. The compressed gas passes into a cooler 52 which is supplied with cold water and in which the heat of compression is removed. It then passes through pipe 53, at 10 atm. and 290° K. into the shell of a dehydrating interchanger 54, in which water present in the gas is in part condensed and in part frozen. This interchanger is provided with baffles 55 and with water drains 56, and to permit occasional de-icing should be provided, in duplicate, with appropriate diversion pipes and valves.

The dehydrated gas passes from the cold end of the interchanger at 10 atm. through pipe 57 to the shell of an interchanger 58 in which it is cooled to 195° K. under 10 atm. pressure. At this temperature the vapor pressure of hydrogen sulphide is 0.03 atm. and the partial pressure is 0.3% of the total pressure. Any hydrogen sulphide present in the gas in excess of this percentage will be condensed in this interchanger and will flow, together with the residual gas, through pipe 59 into a liquid trap 60.

From this trap the liquefied hydrogen sulphide, if in sufficient quantity to be useful as a refrigerant, passes through pipe 61 to an expansion valve 62 by which it is admitted to one of the tube groups of interchanger 58. These tubes being maintained at atmospheric pressure, the liquid hydrogen sulphide evaporates in the upper part of the interchanger. The vaporized sulphide passes through pipe 63 to one of the tube groups of dehydrating interchanger 54 and is passed out of the system at substantially atmospheric temperature and pressure through pipe 64. If the condensate collecting in trap 60 be trifling in quantity, it may be vented at intervals through valve 60a. If the gas to be operated on contains so little hydrogen sulphide that no condensate may be expected at this point, the trap may be omitted from the assembly.

From the top of trap 60 residual gas containing say 0.3% hydrogen sulphide is directed through pipe 65 at 10 atm. and 195° K. into either separator 66a or 66b in which it is further cooled to 160° K. by admixture with a cycled colder gas. At this temperature the vapor pressure of hydrogen sulphide is approximately 0.004 atm. and under an applied pressure of 10 atm. the proportion of hydrogen sulphide remaining in the gas will be reduced to 0.04%, the difference between this residual quantity and the 0.3% entering the separator being reduced to the solid form, as snow crystals. As the method of producing this colder cycled gas and of separating the purified gas from solidified and liquefied products is subject to variation, it will be described at a later point.

As most natural gases, even when stripped of commercial gasoline by compression or absorption, contain highly material proportions of ethane and propane and traces of higher hydrocarbons, a liquid hydrocarbon condensate will be produced in separator 66 simultaneously with the congelation of hydrogen sulphide above described. The maximum quantities condensable in the separator are indicated by the vapor pressures at 195° K. and at 160° K. At 195° K. the vapor pressure of propane is 0.17 atm. and at 160° K. is of the order of 0.03 atm. At an applied pressure of 10 atm. these partial pressures are equivalent to 1.7% and 0.3% respectively and the difference, or 1.4%, will condense in the separator provided the raw gas contained 1.7% or more of propane. If it contained a greater proportion than 1.7%, the excess would have been condensed in interchanger 58 and withdrawn from trap 60 along with the liquefied hydrogen sulphide.

Similarly, the vapor pressure of ethane at 195° K. is 2.0 atm. and at 160° K. is 0.2 atm., corresponding at 10 atm. applied pressure to 20.0% and 2.0% respectively, and the difference or 18.0% will condense in separator 66 if the original gas contained 20% or over of ethane.

In all cases the condensate in 66 will equal the original propane and ethane contents (up to 1.7% and 20.0%) less the amount remaining in the purified gas (0.3% and 2.0%) and as it is not uncommon to encounter gases which contain nearly or quite the maximum quantities of condensable hydrocarbons, the product of the operation of cooling to 160° will be a large volume of uncondensed gas, a much smaller volume of condensed hydrocarbons, and a relatively minute volume of hydrogen sulphide crystals. Such proportions of hydrocarbons cannot be wasted, and at this low temperature and in the liquid form have an important heat absorbing capacity.

In order to recover the liquid hydrocarbons and to utilize their heat absorbing capacity, it is necessary to take the following steps—

(a) to separate the condensate and the solid hydrogen sulphide from the purified gas;

(b) to separate the condensate from the hydrogen sulphide crystals;

(c) to remove the solid hydrogen sulphide from the system, and (d) to remove the hydrocarbons from the system and recover their heat absorbing capacity by evaporation and interchange.

To effect these steps we may use the apparatus shown in the lower right hand corner of the figure in the following manner. Separator 66b, which may be the well known cyclone separator or any suitable form of gas trap, separates the mist of condensate and crystals from the mixed gases. The purified gas passes out of the separator through pipes 67b and 67 to one of the tube groups of interchanger 32, where it is heated to 175° in supercooling liquid methane, then through pipe 68 to interchanger 22 where it is heated to 184° in supercooling liquid ethylene, then through pipe 69 to interchanger 12 where it is heated to 190° in supercooling liquid ammonia, then through pipe 70 to one of the tube groups of interchanger 58 and thence through pipe 71 to one of the tube groups of dehydrating interchanger 54, finally leaving the system through pipe 72 as purified natural gas at substantially atmospheric temperature and at 10 atm. pressure.

In order to prevent freezing of the liquid ammonia in interchanger 12 by the relatively cold gas entering it through pipe 69 it is desirable to provide a bypass loop 73 controlled by a valve 74 which is in turn controlled by a thermostat 75 or other temperature responsive device interposed in pipe 13. This device may be arranged to limit the temperature of the liquid ammonia flowing out of interchanger 12 to a minimum of 196° K.

The colder gas above referred to as being intermixed with the gas stream from trap 60 is withdrawn, at 10 atm. and 160° K., from pipe 67 through a branch pipe 76 and introduced into the cold (lower) end of an interchanger 77. From the upper end of this interchanger the warm gas passes through pipe 78 into a blower or other low head gas pump 79 by which it is forced through pipe 80 into a cooler 81 which is supplied with cold water. From this cooler the gas passes at atmospheric temperature through pipe 82 to the warm end of interchanger 77. From this interchanger the gas passes at 165° K. through pipe 83 to interchanger 35, where it is cooled to 151° K. by the evaporation of liquid methane as already described. From this interchanger the gas flows through pipe 86 and valve 86b to mix with the gas entering cyclone 66a through pipe 65 and valve 65b.

In order to produce a temperature of 160° K. in the mixture, 4.43 parts of gas are cycled through the interchange and cooling system above described to 1.00 part entering through pipe 65, the discharge from the cyclone being 5.39 parts (assuming condensation of 0.04 part) of which 4.43 parts is cycled and 0.96 part passes out of the system. These figures do not include compensation for heat infiltration to the separator, and the actual proportion used will vary with the effectiveness of the insulation provided.

The purpose of the interchange unit comprising interchanger 77 and cooler 81 is to permit the handling of warm instead of cold gas through blower 79 and to absorb any heat liberated in the blowing mechanism. These two pieces of apparatus may be omitted if it is preferred to pump the gas cold.

The liquid condensate containing hydrogen sulphide crystals flows down the cone of separator 66b and passes, under a relatively low head produced by choking valve 87b, through either of pipes 88 or 89, which are provided with stop valves 90 and 91, into one of a pair of filtering vessels 92 and 93. Each of these vessels is provided at a point near its upper end with a foraminous layer or filtering disc 94 which may be of vegetable fibre, diatomaceous earth, mineral or other wool or porous ceramic material of not too fine porosity.

The liquid condensate passes upwardly through this filtering layer, which retains the crystals on its lower face, and flows through one of the stop valves 95 or 96 to a pipe 97b by which it is conducted to a junction with pipe 67 and is thus returned to the cold gas and introduced into interchanger 32 and to the later steps of interchange described for the purified gas.

The condensate withdrawn from the filters is free from hydrogen sulphide and while the above description contemplates its return to the purified gas in order to bring it back to its original constitution, the condensate may be withdrawn for use as such if of more value in the separated form.

Flow through one of the filters is continued until the accumulation of a cake of crystals on the lower face of the filtering layer creates an undesirable back pressure. If the stream be now diverted to the other filter, or elsewhere, the cake tends strongly to drop from the disc and to subside to the bottom of the vessel, the hydrogen sulphide crystals having approximately twice the specific weight of the hydrocarbon condensate in which the cake is constantly immersed. If this step alone does not sufficiently clean the filter disc, one of the bottom valves 99 or 100 may be opened to afford communication with pipe 101, which vents to the atmosphere at any point where waste gases may be disposed of.

The reduction in pressure within the filter vessel thus produced causes vapor to be generated above as well as below the filter disc, thus forcing liquid down through its pores, thoroughly cleaning the lower side of the disc and placing it in condition for renewed use. By withdrawing in this manner a small amount of the condensate the filters may in turn be cleared of hydrogen sulphide crystals without heating or the use of mechanical appliances. The liquid filtered being entirely free from solids other than the crystals, any more refractory stoppage of the disc may be cleared away by entirely relieving the pressure and allowing the filter to stand until it has warmed up to a temperature approximating 190° K. at which the hydrogen sulphide will be entirely gasified and dissipated.

The use of filters and the loss of condensate may be avoided by the use of the apparatus shown in the upper right hand corner of the figure.

Referring to this portion of the figure, the gas separated from the condensate in 66a passes through pipes 67a and 67 to interchanger 32 and thence out of the system through the path already described.

The condensate carrying hydrogen sulphide crystals in suspension flows downwardly from the cone through pipe 102 into the shell of an interchanger 103 in which it is heated to the melting point of solid hydrogen sulphide, 190° K., or a few degrees higher. At 195° K. the vapor pressures of ethane and of hydrogen sulphide are materially below 10 atm. and no evaporation will be caused by this heating, but the hydrogen sulphide is liquefied. It is desirable to connect this interchanger with its warm end down, as shown, to prevent the melting of hydrogen sulphide in the upper end and its recongelation in the lower end.

The gas interchanged against the cold condensate to warm it to 190–195° K. may be withdrawn from pipe 70 at the point indicated at 104, where the gas temperature is about 200° K. and passes through pipe 104 and valve 104a to the lower ends of the tubes of interchanger 103. From the upper ends of the tubes the cooled gas returns to a junction with pipe 70 through pipe 105 and valve 105a at a point downstream from a choke valve 106.

The hydrocarbon condensate and the liquid hydrogen sulphide pass together through pipe 107 into a stratifying vessel 108. As the specific weight of liquid hydrogen sulphide is approximately twice that of liquid ethane, the liquids stratify rapidly. The liquid ethane-propane mixture is continuously drawn off through a valve 109 and pipe 97a to pipes 67a and 67 through which it passes to interchanger 32 and is ultimately returned to the purified gas leaving the system as previously described. The liquid hydrogen sulphide is withdrawn from the system through valve 110 and pipe 111 which leads to a point of use or disposal of hydrogen sulphide. Gauge cocks 112 or other means for ascertaining the liquid level in the stratifying vessel 108 are desirable.

The purified gas vented from the system at 72 is at substantially its initial pressure, and the energy residing in this compressed gas may be utilized to supply part of the power required for compression. Ordinarily this gas will be introduced into a pipe line operating at considerable pressure, and while in the example above given a pressure of 10 atm. was taken by way of illustration, it is possible to operate the system at such pressure as to pass the gas directly into the line without either raising or lowering the pressure, thus reducing the power consumption to that required for refrigeration plus the small amount required to cycle the cooling gas under a balanced pressure and to move the gas through the system.

The temperatures and pressures set forth in the above description are intended to be illustrative only, though they set forth a desirable combination of conditions for this specific purpose. It will be understood that they are subject to variation over a fairly wide range, both as to pressure carried on the gas supplied and the temperatures to which it is cooled in various stages. The general method set forth is also applicable to other gases containing bodies subject to congelation, such for example as carbon dioxide, sulphur dioxide, and various unsaturated hydrocarbons, and is by no means limited to the treatment of the natural gas described.

I claim as my invention:

1. The method of separating hydrogen sulphide from natural gas which comprises: compressing a stream of said gas; removing the heat of compression from said stream; cooling said stream to a temperature below the freezing point of water, whereby said stream is substantially dehydrated; further cooling said stream to approximately 195° K.; separating from said stream any hydrogen sulphide liquefied in said further cooling step; introducing said stream into a chamber and intermixing with said stream a cycled stream of purified gas previously cooled to approximately 151° K., the volumetric proportions of said streams being such that the temperature of the mixture in said chamber is maintained at approximately 160° K., whereby substantially all the hydrogen sulphide remaining in first said stream is frozen and hydrocarbon constituents of said gas are condensed; withdrawing from said chamber a stream of said condensate entraining frozen particles of hydrogen sulphide; separating said particles from said condensate stream; withdrawing a stream of gas from said chamber; adding said separated condensate stream to said gas stream; heating said intermixed stream to vaporize said condensate; withdrawing from said intermixed stream a stream of said mixture and cooling said withdrawn stream to approximately 151° K. to supply said cycled stream, and discharging the remainder of said intermixed stream as natural gas substantially free from hydrogen sulphide.

2. The method of separating hydrogen sulphide from natural gas which comprises: cooling a stream of said gas to a temperature slightly above the freezing point of hydrogen sulphide; separating from said stream any substances liquefied by said cooling; intermixing with said stream a previously cooled cycled stream of gas, the temperature of said cycled stream and the relative volumes of said streams being such that the temperature of the intermixed stream is below the freezing point of hydrogen sulphide; submitting said stream to a centrifugal effect whereby frozen particles of hydrogen sulphide and any hydrocarbons condensing at last said temperature are separated from the gaseous portion of said stream; withdrawing said frozen particles with said condensate and separating said particles from said condensate; withdrawing the gaseous stream from said centrifugal effect; returning said condensate to said withdrawn gaseous stream; discharging from the system a portion of last said stream substantially equal in volume to the initial stream less the substances withdrawn therefrom, and cooling the remainder of said stream to supply said cycled stream.

3. The method of separating hydrogen sulphide from natural gas which comprises: cooling a stream of said gas to a temperature slightly above the freezing point of hydrogen sulphide; separating from said stream any substances liquefied by said cooling; intermixing with said stream a previously cooled cycled stream of gas, the temperature of said cycled steam and the relative volumes of said streams being such that the temperature of the intermixed stream is below the freezing point of hydrogen sulphide; separating from the gaseous portion of said stream frozen particles of hydrogen sulphide and any hydrocarbons condensing at last said temperature and separating said frozen particles from said condensate; withdrawing the gaseous stream from said separating effect; returning said condensate to said withdrawn gaseous stream; discharging from the system a portion of last said stream substantially equal in volume to the initial stream less than the substances withdrawn therefrom, and cooling the remainder of said stream to supply said cycled stream.

4. The method of separating hydrogen sulphide from natural gas which comprises: cooling a stream of said gas to a temperature slightly above the freezing point of hydrogen sulphide; separating from said stream any substances liquefied by said cooling; intermixing with said stream a previously cooled cycled stream of gas, the temperature of said cycled stream and the relative volumes of said streams being such that the temperature of the intermixed stream is below the freezing point of hydrogen sulphide; submitting said stream to a centrifugal effect whereby frozen particles of hydrogen sulphide and any hydrocarbons condensing at last said temperature are separated from the gaseous portion of said stream; withdrawing said frozen particles with said condensate; withdrawing the gaseous stream from said centrifugal effect; discharging from the system a portion of last said stream substantially equal in volume to the initial stream less the substances withdrawn therefrom, and cooling the remainder of said stream to supply said cycled stream.

5. The method of separating hydrogen sulphide from natural gas which comprises: cooling a stream of said gas to a temperature slightly above the freezing point of hydrogen sulphide; separating from said stream any substances liquefied by said cooling; intermixing with said stream a previously cooled cycled stream of gas, the temperature of said cycled stream and the relative volumes of said streams being such that the temperature of the intermixed stream is below the freezing point of hydrogen sulphide; separating from the gaseous portion of said stream frozen particles of hydrogen sulphide and any hydrocarbons condensing at last said temperature; withdrawing the gaseous stream from said separating effect; discharging from the system a portion of last said stream substantially equal in volume to the initial stream less the substances withdrawn therefrom, and cooling the remainder of said stream to supply said cycled stream.

6. The method of separating hydrogen sulphide from natural gas which comprises: cooling a stream of said gas to a temperature slightly above the freezing point of hydrogen sulphide; intermixing with said stream a previously cooled cycled stream of gas, the temperature of said cycled stream and the relative volumes of said streams being such that the temperature of the intermixed stream is below the freezing point of hydrogen sulphide; submitting said stream to a centrifugal effect whereby frozen particles of hydrogen sulphide are separated from the gaseous portion of said stream; withdrawing the gaseous stream from said centrifugal effect; discharging from the system a portion of last said stream substantially equal in volume to the initial stream less the substances removed therefrom, and cooling the remainder of said stream to supply said cycled stream.

7. The method of separating hydrogen sulphide from natural gas which comprises: cooling a stream of said gas to a temperature slightly above the freezing point of hydrogen sulphide; intermixing with said stream a previously cooled cycled stream of gas, the temperature of said cycled stream and the relative volumes of said streams being such that the temperature of the intermixed stream is below the freezing point of hydrogen sulphide; separating from the gaseous portion of said stream frozen particles of hydrogen sulphide; withdrawing the gaseous stream from said separating effect; discharging from the system a portion of last said stream substantially equal in volume to the initial stream less the substances removed therefrom, and cooling the remainder of said stream to supply said cycled stream.

8. The method of separating hydrogen sulphide from admixture with natural gas which comprises: cooling a stream of said gas to a temperature above the freezing point of hydrogen sulphide; cooling said stream by intermixture with a colder gas stream to a temperature at which hydrogen sulphide is frozen and a hydrocarbon condensate is formed; separating said condensate together with entrained frozen particles of hydrogen sulphide from said gaseous intermixture, and separating said frozen particles from said condensate.

9. A method substantially as and for the purpose set forth in claim 8, including the step of returning said condensate to said gaseous intermixture after separation of said frozen particles.

10. A method substantially as and for the purpose set forth in claim 8, in which the condensate and entrained frozen particles are raised to a temperature above the melting point of said particles under such pressure conditions as to maintain said condensate substantially liquid, and the melted particles are collected in a layer below said condensate and withdrawn from said layer in liquid form.

11. A method substantially as and for the purpose set forth in claim 8, in which said frozen particles are separated from said condensate by filtration.

12. A method substantially as and for the purpose set forth in claim 8, in which said frozen particles are separated from said condensate by sedimentation.

13. In a gas fractionating operation including the cooling of a gas stream by intermixture with a cycled stream of gas previously brought to a lower temperature, the steps comprising: dividing said cooled intermixed stream to produce a discharge stream and a cycled stream; withdrawing said discharge stream; heating said cycled stream to substantially atmospheric temperature by a step of heat interchange; mechanically impelling said cycled stream through its cycle; removing from said cycled stream any heat liberated in said impelling step and passing said impelled stream through said heat interchange step whereby the stream passing to the impelling step is heated and the stream passing from the impelling step is cooled, and further cooling said stream to the temperature required for the step of intermixture.

14. Steps substantially as and for the purpose set forth in claim 13, in which the cooling step is produced by heat interchange with an expanded and evaporating liquid refrigerant.

15. Steps substantially as and for the purpose set forth in claim 13, in which the cooling step is produced by heat interchange with expanded and evaporating liquid methane and the gas stream consists of natural gas.

16. In a refrigeration system involving the production of a series of refrigerant liquids by condensation at successively lower temperatures, the step of subcooling streams of said liquids by passing a stream of cold gas in heat interchange relation with a succession of said liquid streams in the order of rising condensing temperature.

LEE S. TWOMEY.